United States Patent
Kerl et al.

(10) Patent No.: US 11,654,381 B2
(45) Date of Patent: May 23, 2023

(54) ROTARY DISK FILTER

(71) Applicant: HUBER SE, Berching (DE)

(72) Inventors: Thomas Kerl, Muehlhausen (DE);
Winfried Regnat, Berching (DE);
Simon Schmausser, Waltersberg (DE)

(73) Assignee: HUBER SE, Berching (DE)

( * ) Notice: Subject to any disclaimer, the term of this patent is extended or adjusted under 35 U.S.C. 154(b) by 31 days.

(21) Appl. No.: 17/361,606

(22) Filed: Jun. 29, 2021

(65) Prior Publication Data
US 2022/0001311 A1    Jan. 6, 2022

(30) Foreign Application Priority Data

Jul. 2, 2020 (DE) .................... 10 2020 117 493.4

(51) Int. Cl.
*B01D 33/23* (2006.01)

(52) U.S. Cl.
CPC ...... *B01D 33/23* (2013.01); *B01D 2201/0415* (2013.01); *B01D 2201/4023* (2013.01); *B01D 2201/4092* (2013.01)

(58) Field of Classification Search
CPC ........... B01D 33/23; B01D 2201/0415; B01D 2201/4023; B01D 2201/4092; B01D 33/17; B01D 33/42
USPC .... 210/323.1, 232, 346, 347, 331, 486, 231, 210/461
See application file for complete search history.

(56) References Cited

U.S. PATENT DOCUMENTS

| | | | |
|---|---|---|---|
| 4,162,982 | A | 7/1979 | Chesner |
| 6,231,761 | B1 | 5/2001 | Mohlin et al. |
| 2011/0024347 | A1 | 2/2011 | Larsson et al. |
| 2018/0345184 | A1* | 12/2018 | Lee ................... B01D 33/23 |

FOREIGN PATENT DOCUMENTS

| | | |
|---|---|---|
| DE | 39 26 962 A1 | 2/1991 |
| DE | 10 2009 029 244 A1 | 3/2011 |
| KR | 101 768 445 B1 | 8/2017 |
| WO | WO 2018/222130 A1 | 12/2018 |

OTHER PUBLICATIONS

German Patent Office Search Report, dated Mar. 2, 2021, 6 pages.
EPO Search Report, dated Dec. 6, 2021, 7 pages.

* cited by examiner

*Primary Examiner* — Madeline Gonzalez
(74) *Attorney, Agent, or Firm* — Dority & Manning, P.A.

(57) ABSTRACT

A rotary disk filter has a central pipe and multiple filter disks arranged around and connected to the central pipe., wherein each filter disk includes multiple filter modules arranged adjacent to one another in the circumferential direction of the central pipe, each having a base frame and two filter elements, which include a filter surface connected to a filter frame. The base frame and the two filter elements delimit a cavity fluidically connected to the central pipe. The filter frames are detachably connected to both sides of the base frame, and removable from the base frame and replaceable with new filter elements. Each filter module is fixed at the central pipe with a threaded spindle independently of the remaining filter modules, wherein the threaded spindle extends through the filter module in the radial direction with respect to the central pipe.

17 Claims, 4 Drawing Sheets

ROTARY DISK FILTER

FIELD OF THE INVENTION

The present invention relates to a rotary disk filter with a central pipe and multiple filter disks arranged adjacent to one another in the longitudinal direction of the central pipe and connected to the central pipe, wherein each filter disk includes multiple filter modules arranged adjacent to one another in the circumferential direction of the central pipe, each having a base frame and two filter elements, which each include a filter frame and a filter surface connected to the filter frame, wherein the base frame and the two filter elements delimit a cavity for accommodating liquid to be filtered, wherein the cavity is fluidically connected to the central pipe for fluid exchange, and wherein the filter frames are detachably connected to both sides of the base frame, and so the filter elements, as necessary, are removable from the base frame and replaceable with new filter elements.

BACKGROUND OF THE INVENTION

A rotary disk filter of the generic type is known, for example, from DE 10 2009 029 244 A1. Corresponding rotary disk filters—and this also applies for the rotary disk filter according to the present invention—are utilized, for example, for removing solids from wastewater.

In principle, a rotary disk filter includes a receptacle, in which the individual filter disks are arranged, adjacent to one another, on the central pipe. The central pipe is drivable about its longitudinal axis with the aid of a drive and together with the individual filter disks. If the wastewater to be treated is now directed into the central pipe, the wastewater flows, starting from the central pipe, through appropriate openings into the individual filter modules of the filter disks. Thereafter, the liquid passes outwardly through the filter surfaces of the filter modules, whereas the solids present in the wastewater are retained depending on the mesh width of the filter material of the filter surfaces.

A discharge device for the retained solids generally extends within the central pipe; at a certain rotation angle of the filter disks, the solids fall back downward due to gravity and through the opening in the central pipe back into the central pipe. There, the solids reach the discharge device and can be removed from the rotary disk filter.

Previously, it has been known to connect the individual filter modules, of which the filter disks are formed, to the central pipe with the aid of screw connections, wherein the screw connections are arranged in the area of the section of the particular filter module in direct contact with the central pipe.

OBJECTS AND SUMMARY OF THE INVENTION

The problem addressed by the present invention is that of refining the known prior art.

The problem is solved by a rotary disk filter having the features described below.

The invention relates to a rotary disk filter with a central pipe and multiple filter disks arranged adjacent to one another in the longitudinal direction of the central pipe and connected to the central pipe. The individual filter disks are each formed from multiple filter modules, which are arranged in the circumferential direction about the central pipe.

Each filter module has a base frame and two filter elements, which each include a filter frame and a filter surface connected to the filter frame. The base frame and the filter frames have an essentially trapezoidal shape. The trapezoidal shapes have two sections extending radially with respect to the longitudinal axis of the central pipe and two preferably slightly curved sections, which connect the radially extending sections to one another. In particular, the curved sections extend concentrically with the central pipe.

Various materials can be utilized as filter material for the filter surface, such as, for example, a mesh fabric or a fiber web. In particular, it is advantageous when the filter material and, thereby, also the filter surfaces are designed to be planar and are bonded or welded to the filter frames.

In order not to have to replace the entire filter module when one of the filter surfaces becomes damaged, it is further provided that the filter frames, to which the filter surfaces are connected, are detachably fixed at the particular base frame. The base frame and the two filter elements can therefore be separated from one another, without the need to damage or destroy one of the integral parts of the filter module. For example, the base frame and the filter elements connected to both sides of the base frame can be detachably connected to one another with the aid of clip connections or the screw connections described in greater detail in the following.

According to the invention, it is now provided that each filter module is fixed at the central pipe with the aid of a threaded spindle independently of the remaining filter modules, wherein the threaded spindle extends through the filter module in the radial direction with respect to the central pipe. The threaded spindles are, for example, screwed together with the central pipe and project radially outward with respect to the longitudinal axis (=rotation axis) of the central pipe. A filter module is fitted onto each threaded spindle, i.e., the threaded spindle extends, starting from the central pipe, through the filter module and is connected thereto in its section situated farthest outward with respect to the central pipe.

Preferably, the threaded spindle extends centrally through the particular filter module. The threaded spindle can be provided with a thread across its entire length or also only in sections. In particular, it is advantageous when the threaded spindle is secured with respect to the central pipe and also with respect to the filter module, with a separate nut in each case. It is also conceivable that the central pipe and/or the filter module have/has a thread and/or threaded bushings, into which the threaded spindle engages.

During the assembly of the rotary disk filter, the individual filter modules are now inserted over the threaded spindles projecting outward from the central pipe. Thereafter, the section of the particular filter module situated farthest outward with respect to the central pipe is fixed with respect to the threaded spindle with the aid of a nut and is pulled in the direction of the central pipe by tightening the nut. As a result, the filter module is pressed against the central pipe and rests against it in a fluid-tight manner. In order to ensure the seal tightness, individual seals can be arranged between the filter modules and the central pipe.

Moreover, it is advantageous when the filter modules are connected to the central pipe exclusively by the threaded spindles and there is no direct mutual fixation of adjacent filter modules in the circumferential direction of the central pipe. In fact, adjacent filter modules of a filter disk can rest against each other. In particular, this is also intended. Preferably, the base frames each have an opening in the area of their sections situated radially outward with respect to the central pipe, and so the wastewater to be filtered can flow, during the rotation of the filter disks, from one filter module into the adjacent filter module of the same filter disk. A scooping effect is reduced as a result.

Even though adjacent filter modules can touch one another, they are preferably not fixed against each other. The position of the filter elements in relation to one another and with respect to the central pipe is therefore preferably exclusively brought about by the force acting in the direction of the central pipe, which is generated by the threaded spindles. In fact, additionally, form-locking connection areas can also be present between adjacent filter modules (for example, in the form of grooves and bulges engaging into the grooves). Appropriate connection areas are exclusively utilized, however, for ensuring that the filter modules cannot be moved in relation to one another in the direction of the longitudinal axis of the central pipe. On the other hand, they do not bring about a mutual fixation of adjacent filter modules in the circumferential direction. In other words: if the connection between the threaded spindle and the particular filter module has been released, the filter module can be removed from the corresponding filter disk, without the need to release connections between individual filter modules.

It is also advantageous when the filter modules each have an internal guide for one of the threaded spindles. An appropriate guide facilitates the fitting of the filter modules onto the individual threaded spindles during the assembly of the rotary disk filter. The guide can be formed, for example, by one or multiple guide surface(s), which are arranged within the cavity of the filter module or extend therein.

It is also advantageous when the guide includes a guide pipe, which extends between two opposite sides of the base frame and is connected thereto. The opposite sides are the side resting against the central pipe and the side of the filter module opposite this side (with respect to the cavity). In particular, the guide pipe should be completely closed toward the outside between the aforementioned sides and completely enclose the threaded spindle after the filter module has been fitted. This has the advantage that the threaded spindle does not come into contact with the wastewater to be treated during the operation of the rotary disk filter and, thereby, oxidation of the surface of the threaded spindle does not take place.

It is also advantageous when the guide pipe is an integral part of the base frame or is directly connected thereto. In particular, it is advantageous when the guide pipe represents a connection of the side of the base frame adjacent to the central pipe and the outer side of the base frame opposite this side. Therefore, the connecting pipe can contribute to the stability of the base frame. The guide pipe can be made, moreover, of plastic or also metal.

It is also advantageous when the two filter frames of a filter module are directly connected to each other with the aid of screws. The filter frames are preferably not screwed together with the base frame. Rather, it is advantageous when the screws extend from one filter frame to the second filter frame, and so the individual filter elements of a filter module are mutually fixed with the aid of the screws.

It is advantageous when the base frame has throughbores, through which the screws extend, starting from one filter frame to the second filter frame. The through-bores have a diameter, which is greater than the outer diameters of the screws, and so the screws can be inserted through the through-bores without any effort or with only a small amount of effort. The screws penetrate the through-bores. If the screws are now tightened, the two filter frames are pulled toward one another and, thereby, against the base frame from both sides. Preferably, sealing elements are arranged between the base frame and the filter elements, in order to ensure the seal tightness of the filter module in the area of the corresponding contact points.

It is also advantageous when the screws each engage directly into a thread in the filter frame. The thread can have been cut into the particular filter frame before the assembly of the filter module. It is also conceivable that the filter frames have threaded bushings, into which the screws engage. Preferably, it is provided, however, that the filter frames have individual (blind) bores, which still do not have a thread before the first assembly of the filter module. Rather, the thread arises due to the penetration by the screw. The screw cuts its own thread into the bore.

It is also advantageous when a first portion of the screw heads of the screws of a filter module is located on the side of the first filter frame and a second portion of the screw heads is located on the side of the second filter frame of the filter module. Each filter frame therefore preferably has a certain number of bores, through which screws can be inserted from the outside. Bores are also present, which are preferably designed as blind bores. Finally, screws engage into these bores, which were inserted, starting from the particular other filter frame, through the bores of the other filter frame and the through-bores of the base frame. The above-mentioned threads are preferably cut into the blind bores by the screws.

Moreover, it is advantageous when the filter frames and the base frame of a filter module are form-lockingly connected with the aid of connecting elements, wherein the connecting elements limit or prevent a relative motion between the filter frames and the base frame in the direction of the longitudinal extension of the threaded spindle. In particular, it is advantageous when the connecting elements are arranged on the outer (with respect to the central pipe) side of the particular filter module. In particular, the connecting elements should be arranged in the center on this side and, thereby, directly adjacent to the threaded spindle. If the aforementioned side is now pulled in the direction of the central pipe with the aid of the threaded spindle and/or a nut interacting with the threaded spindle, in order to fix the filter module with respect to the central pipe, the connecting elements ensure that a relative motion cannot occur between the base frame and the filter elements. The force applied via the threaded spindle onto the base frame therefore also acts on the filter elements, and so the filter elements absorb a portion of the force applied by the threaded spindle onto the base frame.

It is also advantageous when a portion of the connecting elements is designed as pegs and a further portion of the connecting elements is designed as recesses, wherein the pegs extend into the recesses. For example, it would be conceivable that the base frame has multiple pegs, wherein at least one peg projects in the direction of the first filter frame and a further peg projects in the direction of the second filter frame. The two filter frames have corresponding recesses, into which the pegs engage when the filter frames are connected to the base frame. Of course, the base frames can also have the recesses and the filter frames can have the pegs.

It is also advantageous when the filter frames each have one or multiple brace(s), which extend(s) between opposite and/or adjacent sections of the filter frame. As a result, the stability of the filter module is considerably increased as compared to a variant without braces. The brace or the braces can be designed as one piece with the particular filter frame. It is also conceivable that the base frame also has one or multiple brace(s). For example, the brace(s) of the filter frame is/are arranged on the side of the filter surface facing the cavity of the filter module. It is also advantageous, however, when the filter surface rests against the brace(s) from the inside with respect to the cavity. As a result, the filter surface is supported by the brace(s) during the filtering process, in which the liquid flows, starting from the cavity, toward the outside through the filter surfaces.

It is also advantageous when the braces or one of the braces of a particular filter module have/has a Y-shape. The brace therefore has three limbs, wherein each limb is connected to another side of the filter frame. As a result, forces can be transmitted from one side to an adjacent side.

It is advantageous when the threaded spindle extends in parallel to one limb of the Y-shaped brace. In particular, a limb should be connected to each section of the filter frame extending radially with respect to the longitudinal axis of the central pipe and a third limb should be connected to the side of the filter frame situated farthest outward with respect to the central pipe. If a force is now applied via the threaded spindle onto the aforementioned outer side, this force can be transmitted further via the brace onto the two adjacent, radially extending sections of the filter frame. The latter-mentioned sections each rest against corresponding sections of the adjacent filter modules of a filter disk, and so the applied force does not bring about a bending of the filter frames. Rather, it is ensured via the force application that the filter modules are pulled, in their entirety, against the central pipe in a stable manner.

BRIEF DESCRIPTION OF THE DRAWINGS

Further advantages of the invention are described in the following exemplary embodiments, wherein.

DETAILED DESCRIPTION OF EXEMPLARY EMBODIMENTS

Figure 1:
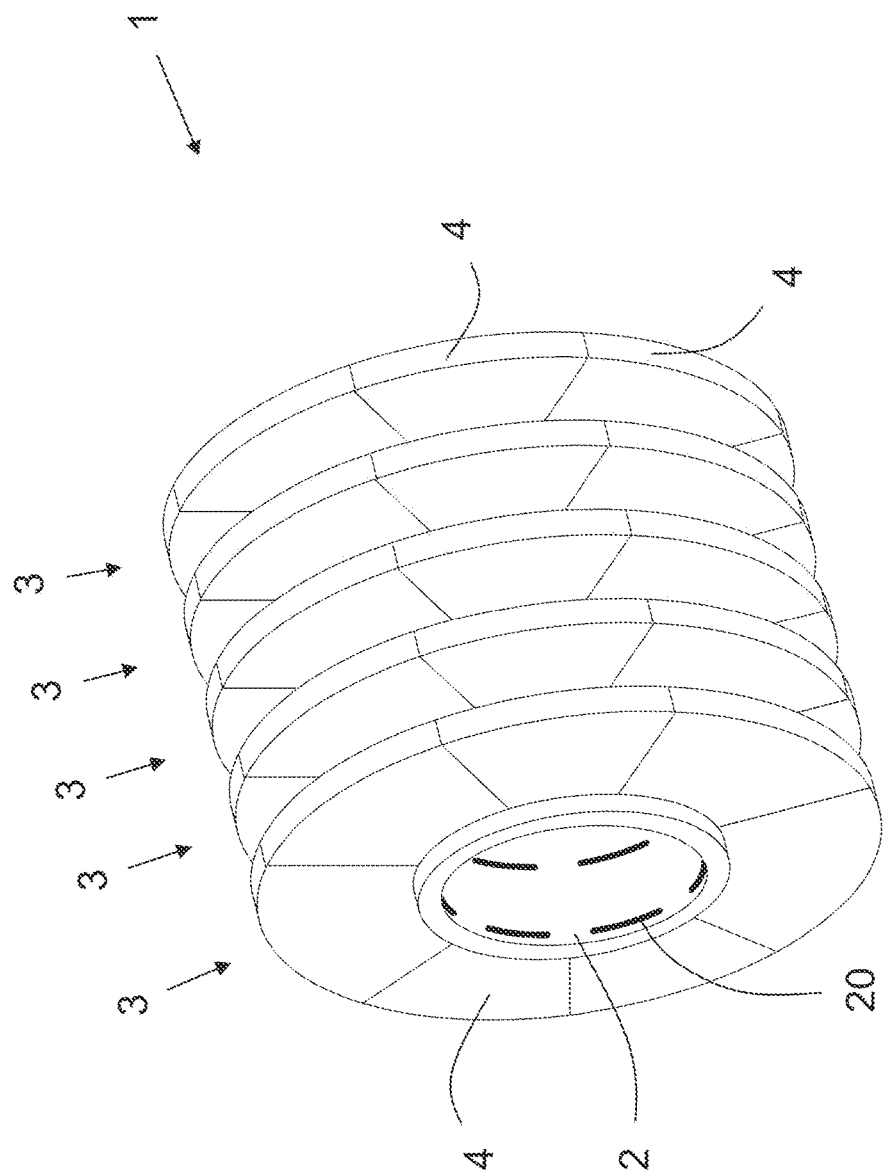
FIG. 1 shows a diagrammatic perspective view of a conventionally arranged rotary disk filter.

FIG. 1 shows a conventional arrangement of the components of a rotary disk filter 1, wherein only its central pipe 2 and the filter modules 4 connected to the central pipe 2 and forming the individual filter disks 3 are represented. Of course, the rotary disk filter 1 includes further components such as, for example, a receptacle accommodating the filter disks 3 for the liquid to be treated, or a drive, in order to be able to drive the central pipe 2 with the filter disks 3 in a rotary motion. The rotary disk filter 1 also includes an intake (not shown) for the wastewater to be filtered and a discharge (also not shown) for the filtrate. Moreover, a discharge device (not represented) is present, with the aid of which the solids retained by the filter surfaces 8 of the filter disks 3 can be removed from the rotary disk filter 1.

In principle, the rotary disk filter 1 therefore includes a central pipe 2, which is set into rotation during the filtration and on which individual filter modules 4 are fastened, wherein multiple filter modules 4 arranged adjacent to one another in the circumferential direction form the individual filter disks 3.

Here, it is pointed out that, in part, only a portion of multiple elements of the same kind (such as, for example, the filter modules 4 in FIG. 1) is provided with a reference character, for the sake of greater clarity. In principle, similarly represented elements are elements of the same kind, however, even though not all elements of this type are provided with a reference character.

Figure 3:
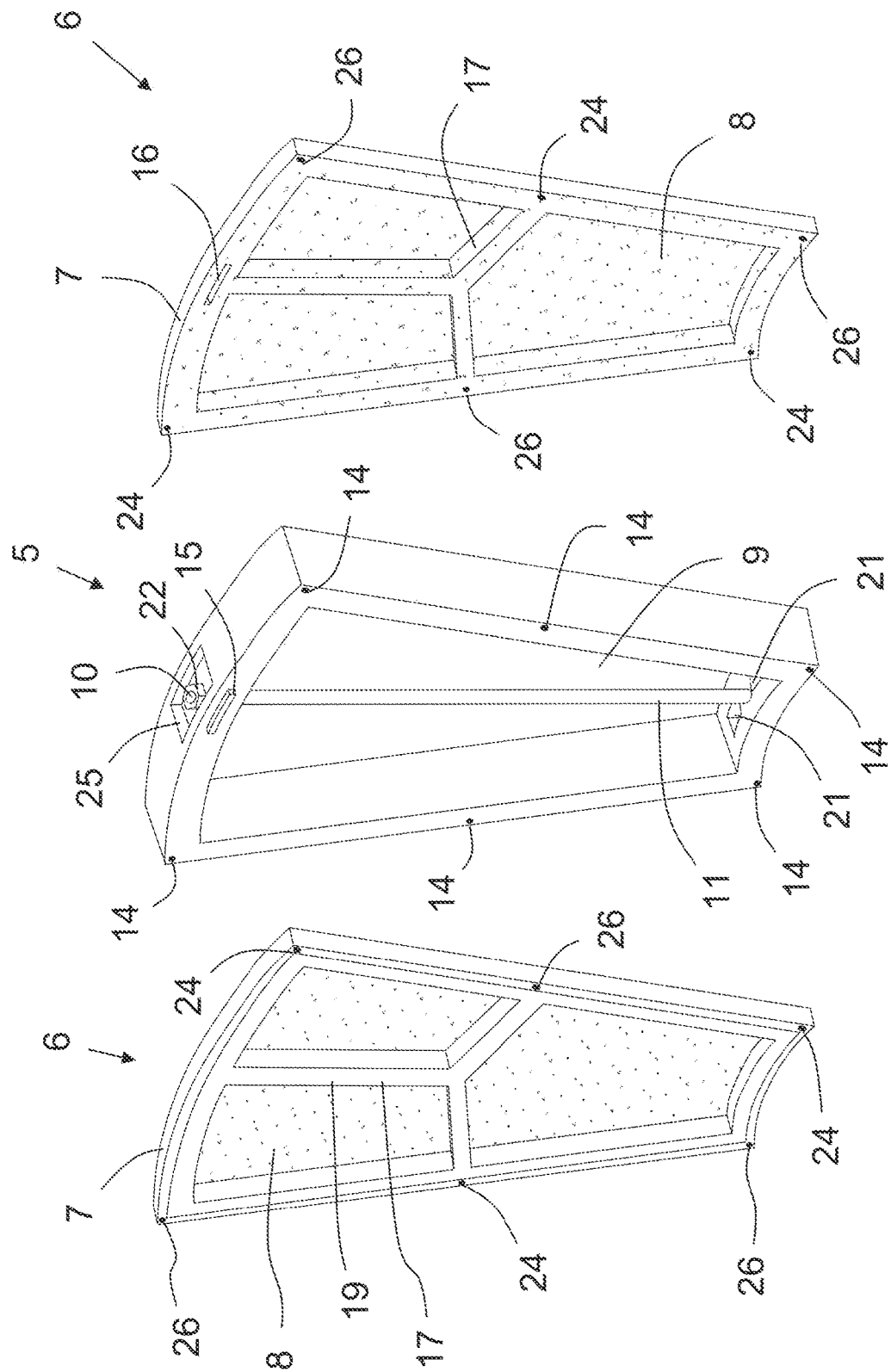
FIG. 3 shows the integral parts of a filter module according to the invention before its assembly.

During the filtration of the wastewater to be filtered, the wastewater flows through the central pipe 2 and, finally, through the openings 20 thereof into the individual filter modules 4 (their base frames 5 as shown in FIG. 3 also have appropriate openings 21). While the filtrate flows through the filter surfaces 8 of the filter modules 4 from the cavity 9 arranged within the filter modules 4 to outside the filter disks 3, solids up to a certain particle size are retained by the filter surfaces 8 of the filter modules 4. In this way, a separation of the solids from the filtrate takes place.

Figure 2:
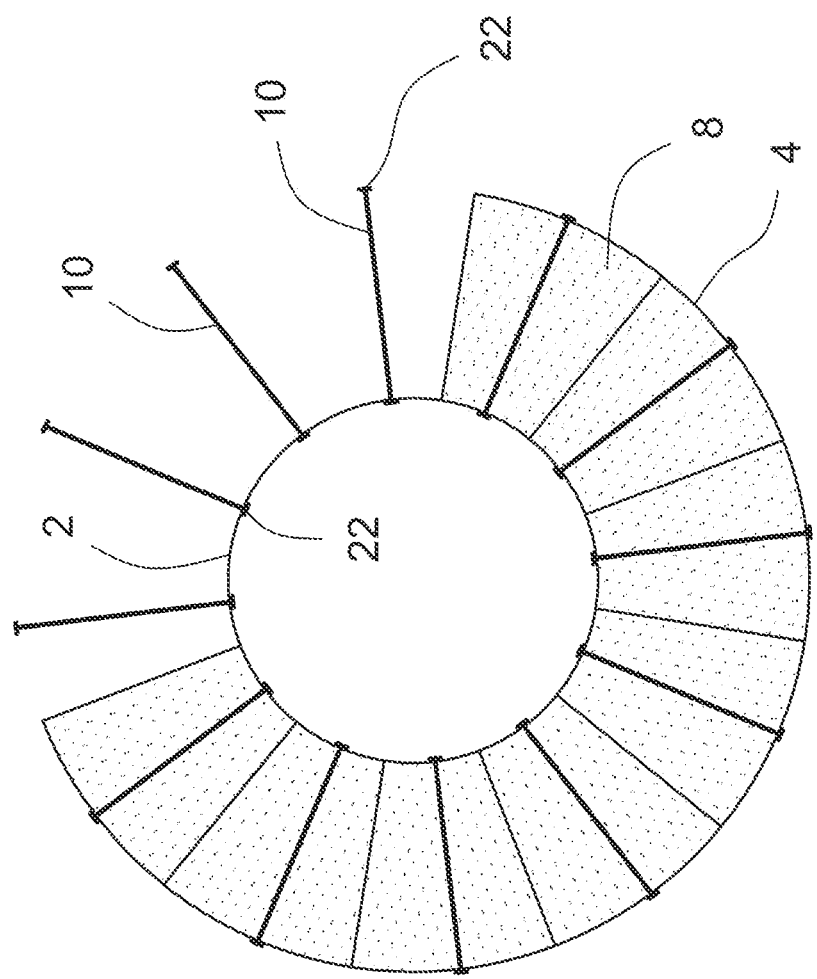
FIG. 2 shows a partially assembled filter disk.

FIG. 2 now shows one possible embodiment of the fastening, according to the invention, of the filter modules 4 at the central pipe 2. As is to be derived from this figure, multiple threaded spindles 10 extend radially outward starting from the central pipe 2. The threaded spindles 10 are fixed with respect to the central pipe 2, for example, with the aid of nuts 22. Of course, the central pipe 2 can also have a thread, which interacts with the particular threaded spindle 10. Other fastening possibilities, for example, welding the threaded spindles 10 to the central pipe 2, are also conceivable.

In order to connect the filter modules 4 to the central pipe 2, the filter modules 4 are inserted over the threaded spindles 10 and fixed from the outside with the aid of a nut 22, as described in greater detail in the following. The outer nuts 22 therefore cause the filter modules 4 to be pressed in the direction of the central pipe 2 and finally sealingly rest against it.

FIG. 3 shows the individual main integral parts of one possible embodiment of a filter module 4 according to the invention. The filter module 4 has a base frame 5, to each side of which a filter element 6 is connected. The filter element 6 is made up of a filter frame 7, preferably made of plastic, and a filter surface 8 made of a filter material, wherein the filter surface 8 is preferably bonded or welded to one of the opposite sides of the filter frame 7.

Figure 4:
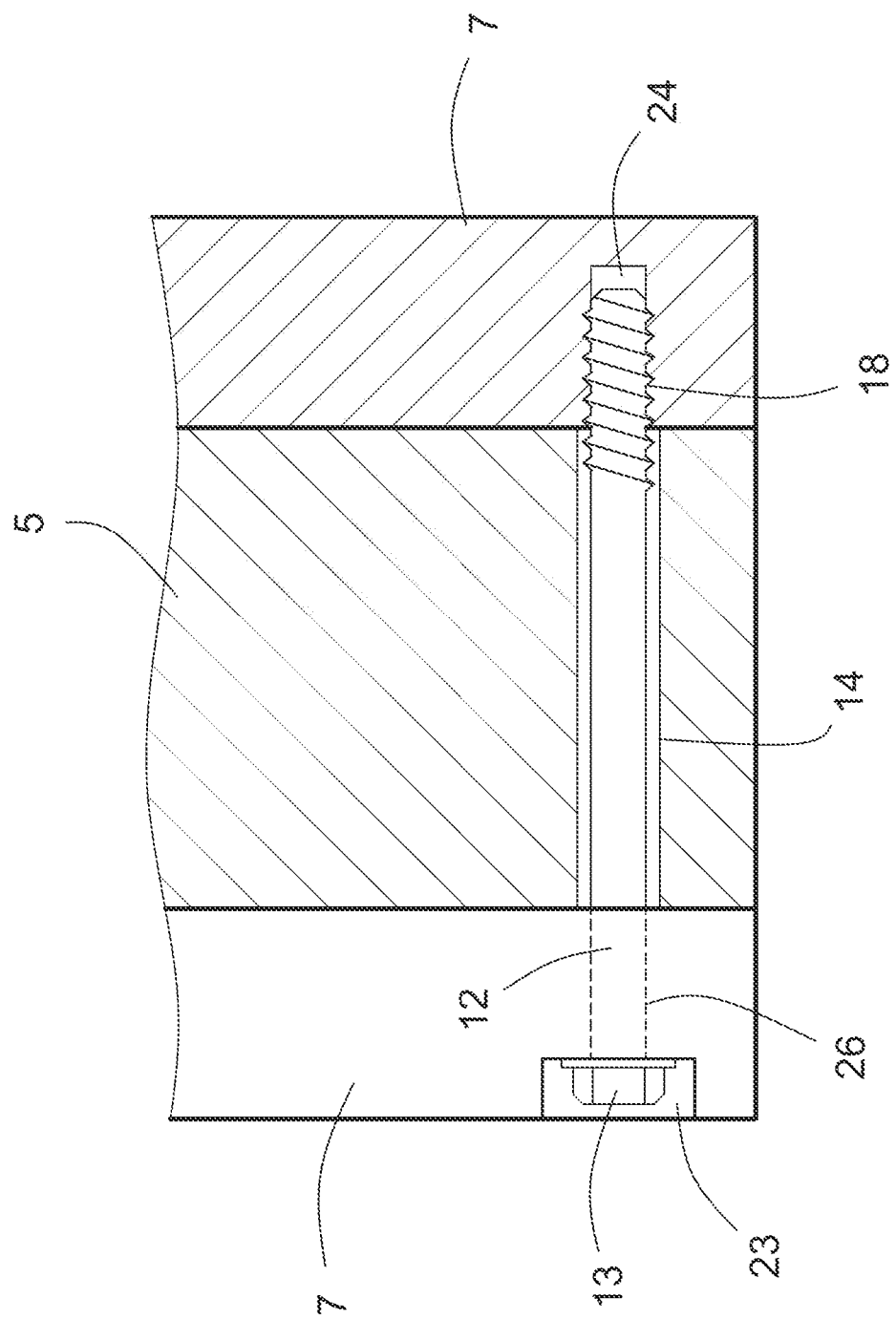
FIG. 4 shows a partially cut section of a filter module according to the invention.

In order to be able to connect the filter frames 7 and, thereby, the filter elements 6 in their entirety to the base frame 5, reference is made to FIG. 4 in which a first filter frame 7 has a plurality of bores 26, through each of which a screw 12 can be inserted during the assembly of the filter module 4. The base frame 5 has a corresponding number of through-bores 14, which are utilized for the passage of the screws 12. Finally, the second filter frame 7 has multiple blind bores 24, into which the screws 12 starting from the first filter frame 7 can be screwed.

In this context, reference is made to FIG. 4, which shows a partially cut section—arranged at the bottom with respect to FIG. 3—of a fully assembled filter module 4. As is to be derived from this figure, the screw 12 extends from a screw head receptacle 23 (defining a recess for accommodating the screw head 13) through a bore 26 in the filter frame 7 arranged on the left with respect to the sheet plane, through the through-bore 14 in the base frame 5 into the blind bore 24 in the second filter frame 7 arranged on the right. The thread 18 of the screw 12 was screwed into this blind bore 24, and so a female thread was cut into the filter frame 7 in the area of the blind bore 24. A separate nut 22 can be dispensed with in this case.

For the rest, it is pointed out here that it can be entirely advantageous when a portion of the screws 12 shown in FIG. 3 extend into the filter module 4 from the left and a second portion extends from the right, with respect to the sheet plane. In other words: a portion of the screws 12 is screwed in similarly to FIG. 4, while a second portion of the screws 12 was screwed in from right to left with respect to FIG. 4. The bore 26 is located, in this case, in the area of the filter frame 7 shown on the right in FIG. 3, while the blind bore 24 is located in the area of the left filter frame 7. The screws 12 can also be screwed in, in alternation, once from the left and once from the right, i.e., once starting from the first filter frame 7 and once starting from the second filter frame 7. Such an approach is also shown in FIG. 3. As a result, a particularly uniform force application takes place.

FIG. 3 shows, moreover, that it is advantageous when the base frame 5 includes a guide pipe 11, through which the threaded spindle 10 can be inserted when the base frame 5, with the filter frames 7 fastened thereon, is fitted onto a threaded spindle 10, which is shown in FIG. 2 and not yet occupied by a filter module 4. The base frame 5 and, thereby, the entire filter module 4 can finally be fixed with respect to the threaded spindle 10 with a nut 22 and, in so doing, pressed against the central pipe 2. In order to accommodate the nut 22, moreover, a bulge 25 can be present in the upper—with respect to FIG. 3—area of the base frame. This upper area represents the outer area of the filter module 4 (cf. above description) after the fixation at the central pipe 2.

In order to introduce the force applied by the nut 22 onto the outer area of the base frame 5 uniformly into the filter module 4, it is advantageous when the base frame 5 and/or, as shown in FIG. 3, the filter frames 7, has/have one or multiple brace(s) 17. In particular, it is advantageous when the particular brace 17 has a Y-shape, wherein one limb 19 extends, starting from the aforementioned outer area of the filter module 4, in parallel to the threaded spindle 10. This limb 19 finally divides into two further limbs 19 of the Y-shape, which are connected to the sections of the filter frames 7 extending radially with respect to the central pipe 2. In order to now transmit the force applied onto the base frame 5 by the nut 22 onto the filter frames 7, it is advantageous when the filter frames 7 and the base frame 5 have connecting elements.

In the example from FIG. 3, the connecting elements are designed as pegs 15 and recesses 16 corresponding to the pegs 15. After the filter frames 7 have been connected to the base frame 5, the pegs 15 arranged on both sides of the base frame 5 engage into the particular recesses 16 of the filter frames 7 (of course, the base frame 5 also has a corresponding peg 15 on the back side, which is not visible in FIG. 3; similarly, the filter frame 7 represented on the left has a recess 16 on its back side, which is not visible, into which the visible peg 15 engages in the assembled condition of the filter module 4).

Finally, FIG. 3 shows that it is advantageous when the filter surface 8 is arranged between the filter frame 7 and the base frame 5. In this case, the filter surface 8 is supported toward the outside by the brace 17.

The present invention is not limited to the represented and described exemplary embodiments. Modifications within the scope of the claims are also possible, as is any combination of the features, even if they are represented and described in different exemplary embodiments.

LIST OF REFERENCE CHARACTERS 1 rotary disk filter
2 central pipe
3 filter disk
4 filter module
5 base frame
6 filter element
7 filter frame
8 filter surface
9 cavity
10 threaded spindle
11 guide pipe
12 screw
13 screw head
14 through-bore
15 peg
16 recess
17 brace
18 thread
19 limb
20 opening in the central pipe
21 opening in the base frame
22 nut
23 screw head receptacle
24 blind bore
25 bulge
26 bore

What is claimed is:

1. A rotary disk filter comprising:
a central pipe that elongates along a longitudinal axis;
a plurality of filter disks, each filter disk spaced apart along the longitudinal axis from each other filter disk, each filter disk connected to the central pipe;
wherein each filter disk includes a plurality of filter modules, wherein the filter modules in the plurality of filter modules of each filter disk are arranged adjacent to one another in the circumferential direction of the central pipe;
wherein each filter module includes a base frame disposed between two filter elements, wherein each of the two filter elements is connected to the base frame to delimit a cavity for accommodating liquid to be filtered, wherein the cavity is fluidically connected to the central pipe for fluid exchange between the cavity and the central pipe;
wherein each filter element includes a filter frame and a filter surface connected to the filter frame, wherein each of the two filter frames is detachably connected to a respective opposite side of the base frame in a manner rendering the filter elements selectively removable from the base frame and replaceable with new filter elements;
wherein each filter module is fixed at the central pipe with the aid of a threaded spindle independently of the remaining filter modules, wherein the threaded spindle extends through the filter module in the radial direction with respect to the central pipe; and
a plurality of connecting elements that connect in a form-locking manner the respective base frame of each respective filter module with the respective filter frames of the respective filter module, wherein the plurality of connecting elements limit or prevent a relative motion between the respective filter frames and the respective base frame of the respective filter module in the direction of the longitudinal extension of the respective threaded spindle of the respective filter module.

2. The rotary disk filter according to claim 1, wherein each respective filter module is connected to the central pipe exclusively via the threaded spindle of the respective filter module without any direct mutual fixation of adjacent filter modules existing in the circumferential direction of the central pipe.

3. The rotary disk filter according to claim 1, wherein each respective filter module includes an interior guide for the threaded spindle of the respective filter module.

4. The rotary disk filter according to claim 3, wherein the interior guide includes a guide pipe, which extends between the two opposite sides of the base frame and is connected to the base frame.

5. The rotary disk filter according to claim 4, wherein the guide pipe is directly connected to the base frame.

6. The rotary disk filter according to claim 3, wherein the guide pipe is an integral part of the base frame.

7. The rotary disk filter according to claim 1, wherein a first one of the plurality of connecting elements defines a recess and a second one of the plurality of connecting elements defines a peg that protrudes into and is held in the recess.

8. The rotary disk filter according to claim 1, wherein each of the respective filter frames has opposite sections and a brace that extends between the opposite sections of the respective filter frame.

9. The rotary disk filter according to claim 8, wherein the brace of one of the filter frames of one of the filter modules defines a Y-shape.

10. The rotary disk filter according to claim 9, wherein the brace that defines a Y-shape includes a limb that extends in parallel to the threaded spindle.

11. The rotary disk filter according to claim 1, wherein each of the respective filter frames has adjacent sections and a brace that extends between the adjacent sections of the respective filter frame.

12. The rotary disk filter according to claim 11, wherein the brace of one of the filter frames of one of the filter modules includes defines a Y-shape.

13. The rotary disk filter according to claim 12, wherein the brace that defines a Y-shape includes a limb that extends in parallel to the threaded spindle.

14. A rotary disk filter, comprising;
a central pipe that elongates along a longitudinal axis;
a plurality of filter disks, each filter disk spaced apart along the longitudinal axis from each other filter disk, each filter disk connected to the central pipe;
wherein each filter disk includes a plurality of filter modules, wherein the filter modules in the plurality of filter modules of each filter disk are arranged adjacent to one another in the circumferential direction of the central pipe;
wherein each filter module includes a base frame disposed between two filter elements, wherein each of the two filter elements is connected to the base frame to delimit a cavity for accommodating liquid to be filtered, wherein the cavity is fluidically connected to the central pipe for fluid exchange between the cavity and the central pipe;
wherein each filter element includes a filter frame and a filter surface connected to the filter frame, wherein each of the two filter frames is detachably connected to a respective opposite side of the base frame in a manner rendering the filter elements selectively removable from the base frame and replaceable with new filter elements;
wherein each filter module is fixed at the central pipe with the aid of a threaded spindle independently of the remaining filter modules, wherein the threaded spindle extends through the filter module in the radial direction with respect to the central pipe;
a first plurality of screws that directly connects a first one of the two filter frames of a respective filter module to a second one of the two filter frames of the respective filter module; and
a second plurality of screws that directly connects the second one of the two filter frames of the respective filter module to the first one of the two filter frames of the respective filter module.

15. The rotary disk filter according to claim 14, wherein the base frame of each respective filter module defines through-bores, through which the screws extend, starting from the first one of the two filter frames to the second one of the two filter frames.

16. The rotary disk filter according to claim 14, wherein each of the respective first plurality of screws engages directly into a respective thread defined in the first one of the two filter frames.

17. The rotary disk filter according to claim 16, wherein each of the first plurality of screws defines at one end thereof a respective screw head, wherein the screw heads of the first plurality of screws are located on the side of the first filter frame, and wherein each of the second plurality of screws defines at one end thereof a respective screw head, wherein the screw heads of the second plurality of screws are located on the side of the second filter frame.

* * * * *